United States Patent
Sand et al.

(10) Patent No.: US 6,596,802 B1
(45) Date of Patent: Jul. 22, 2003

(54) ORGANOCLAYS AS PROCESSING AIDS FOR PLASTICIZED THERMOPLASTICS

(75) Inventors: Irving Daniel Sand, Loveland, OH (US); Rodney Layne Piner, Kingsport, TN (US); John Walker Gilmer, Kingsport, TN (US); Jeffrey Todd Owens, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/649,000

(22) Filed: Aug. 28, 2000

(51) Int. Cl.[7] .............................. B29C 47/38; C08K 3/34; C08K 5/10
(52) U.S. Cl. ................... 524/445; 524/297; 524/447; 106/487; 264/177.2; 264/211; 264/211.21; 264/328.18
(58) Field of Search .............................. 428/290, 328.1, 428/292.1; 524/445, 447, 297; 504/148; 106/487; 523/216; 264/328.18, 211.21, 211, 177.2

(56) References Cited

U.S. PATENT DOCUMENTS

| | | | | |
|---|---|---|---|---|
| 2,531,427 A | * | 11/1950 | Hauser | |
| 2,831,809 A | * | 4/1958 | Peterson | |
| 3,186,961 A | * | 6/1965 | Sears | |
| 3,422,185 A | * | 1/1969 | Kuritzkes | |
| 3,516,959 A | * | 6/1970 | Jonas | 260/28 |
| 3,667,733 A | | 6/1972 | Fritsch | 259/6 |
| 3,864,294 A | * | 2/1975 | Busch | |
| 4,115,509 A | | 9/1978 | Kendall-Smith et al. | 264/331 |
| 4,203,887 A | * | 5/1980 | Goedde et al. | |
| 4,208,218 A | * | 6/1980 | Finlayson | |
| 4,313,867 A | * | 2/1982 | Duvdevani | |
| 4,317,761 A | * | 3/1982 | Abolins | |
| 4,341,565 A | * | 7/1982 | Martenson | 106/307 |
| 4,425,457 A | * | 1/1984 | Christiansen et al. | |
| 4,444,714 A | * | 4/1984 | Martenson | 264/328.18 |
| 4,492,782 A | * | 1/1985 | Williams et al. | |
| 4,546,126 A | * | 10/1985 | Breitenfellner et al. | |
| 4,708,975 A | * | 11/1987 | Shain | |
| 4,792,464 A | * | 12/1988 | Martenson | |
| 4,889,673 A | | 12/1989 | Takimoto | 264/118 |
| 5,231,128 A | * | 7/1993 | Nakata et al. | |
| 5,248,720 A | * | 9/1993 | Deguchi et al. | |
| 5,362,778 A | | 11/1994 | Famili et al. | 524/50 |
| 5,421,876 A | * | 6/1995 | Janoski | 106/278 |
| 5,576,257 A | * | 11/1996 | Jordan | |
| 5,721,306 A | | 2/1998 | Tsipursky et al. | 524/449 |
| 6,034,163 A | * | 3/2000 | Barbee et al. | |

FOREIGN PATENT DOCUMENTS

| | | | | |
|---|---|---|---|---|
| EP | 413 972 A2 | | 7/1990 | C08L/71/12 |
| EP | 846 660 A2 | | 11/1997 | C01B/33/44 |
| JP | 51-23547 | * | 2/1976 | |
| RU | 1562-341 A | * | 5/1990 | |
| WO | WO 97/49757 | | 6/1997 | C08K/5/103 |
| WO | WO 99/43747 | * | 9/1999 | |
| WO | WO 00/61683 | * | 10/2000 | |

OTHER PUBLICATIONS

Plastic Additives Handbook, Chapter 5 Plasticizers, Dipl. Ing L. Meier, BASF AG, Ludwigshafen, Federal Republic of Germany; Hanser Publishers; 1993; pp. 327–329.

Hanbook of Coatings Additives, Robert Van Doren, NL Chemicals, Inc.; 1987; pp. 1–6.

Plastified Epoxy Resins Modified by Hydrophilic and Hydrophobic Silica; Fanica Mustata and Ioan Bicu; Marcel Dekker, Inc.; 1998; pp. 127–140.

A Mixing Study of Various Single Screw Mixing Elements Using In–Line Melt Analysis (I.M.A.); Gary Harrah, Tim Womer; 1998; pp. 267–271.

An Introduction to Clay Colloid Chemistry; H. van Olphen; Kreiger Publishing Company; 1991; pp. 184–185.

* cited by examiner

*Primary Examiner*—Peter Szekely
(74) *Attorney, Agent, or Firm*—Eric D. Middlemas; Bernard J. Graves, Jr.

(57) ABSTRACT

This invention describes the use of organoclays as additives to plasticizers to provide a plasticizer composition, to allow the mixing of the plasticizers with thermoplastic resins in the same process used to convert the resin formulation to finished product. The use of this invention eliminates the need for a preliminary compounding step to incorporate plasticizers into thermoplastics prior to extrusion or molding.

16 Claims, No Drawings

ORGANOCLAYS AS PROCESSING AIDS FOR PLASTICIZED THERMOPLASTICS

FIELD OF THE INVENTION

This invention belongs to the field of thermoplastic resins. In particular, it relates to nanocomposite compositions comprising plasticizers and their use in polymer processing.

BACKGROUND OF THE INVENTION

The most common means of producing a finished article, such as a film or injection molded part, from a plasticized thermoplastic resin consists of the following steps: (1) mixing the molten thermoplastic with the plasticizer or plasticizers (2) isolating this mixture as a solid, usually in the form of pellets and (3) supplying this solid mixture to a second thermal process, such as extrusion or injection molding, in order to convert the plasticized thermoplastic material into the finished article. Such a process is described in U.S. Pat. No. 4,889,673, U.S. Pat. No. 5,362,778, and in European Patent Application Publication No. 0413972A2.

U.S. Pat. No. 3,667,733 describes a device that can be placed immediately before the thermal conversion process to produce the finished article; the purpose of this device is to circumvent the need for a separate compounding step. This patent recognized the expense associated with the compounding step but the device claimed in this patent would require considerable capital to build and install. This patent does state, "that it is, in effect, impossible to plasticate in single screw machines".

The use of organoclays as thixotropic agents for liquids is also known. Organoclays are used in solvent-borne and water-borne coatings for this reason. They are also used in combination with hydrocarbons to make "inorganic gel" greases. The use of organoclays to deliver active ingredients to plastics has been described in European Patent Application Publication No. EP0846660A2 and U.S. Pat. No. 5,721,306. EP 0846660A2 describes the use of clay platelets that have been "intercalated with long chain monomers" and "combined with a polar organic solvent" to plasticize thermoplastic or thermosetting polymers. No part of this patent application suggests that the inventors recognized the ability to use plasticizers that had been modified with organoclays to eliminate the need for a separate compounding step as provided by the present invention as described below. This patent application also teaches that "the exfoliated platelets are free to move throughout the polymer matrix" and when mixed with a carrier or solvent, "maintain viscosity and thixotropy of the carrier material". Such a consideration does not hold for solids at room temperature such as the plasticizers that are the subject of this invention. Finally, the intercalates taught in EP 0846660 are designed to contain at least about 4% water, by weight.

SUMMARY OF THE INVENTION

One of the issues faced in the commercialization of highly plasticized thermoplastic formulations is the need to compound the plasticizer with the thermoplastic resin prior to processing the formulation into a finished film, sheet or molded part. This invention describes the use of organoclays as additives to plasticizers to provide a plasticizer composition, to allow the mixing of the plasticizers with the thermoplastic resins in the same process used to convert the resin formulation to finished product. The practice of this invention eliminates the need for a preliminary compounding step prior to extrusion or molding. The preferred plasticizers in this invention are those that are solids at room temperature. Benzoate esters are one class of these solid plasticizers and employed below in the examples. The preferred organoclays in this invention are those based on sodium montmorillonite modified by the exchange of the sodium ion with an organic ammonium ion. In a preferred embodiment, when the plasticizer has sufficient organoclay to have an inorganic content of about 10 wt %, the plasticizer composite can be formed into pellets. These plasticizer pellets can then be blended with thermoplastic resin pellets and the physical blend may then be directly extruded into film or sheet, or can be injection molded into parts.

This invention also provides the use of solid ester plasticizers that have been modified with quaternary ammonium layered smectite clays thereby circumventing the need for a separate compounding step to obtain plasticized thermoplastic products. Thus, the plasticizer that is modified with organoclay and the thermoplastic can be added to the film/sheet extruder or injection-molding machine to make the final product in one step.

As used herein, the terms set forth below will have the following meanings:

"Layered Material" shall mean an inorganic material such as a smectite clay mineral, that is in the form of a plurality of adjacent, bound layers and has a thickness, for each layer of about 3 angstroms to about 50 angstroms, preferably about 10 angstroms.

"Platelets" shall mean individual layers of the Layered Material.

"Gallery" shall mean the space between two adjacent Platelets.

A "clay" is defined here as a swellable layered clay material, such as the smectite clay mineral montmorillonite. An "organoclay" is defined here as a clay that has been ion exchanged with an onium ion.

DETAILED DESCRIPTION OF THE INVENTION

Thus, in a first embodiment of the present invention, there is provided a plasticizer composition comprising a plasticizer and an organically-modified clay, wherein said composition contains less than 4%, preferably less than 1% water by weight. Moreover, virtually any water which is present will be "bound" water. That is, it will exist as part of the crystal structure of the clay and requires temperatures in excess of 250° C. to be driven off. The plasticizer compositions of the present invention are useful as processing aids for thermoplastic resins and can be added directly to the thermoplastic resin during the thermal extrusion or molding process to provide plasticized finished articles.

In a second embodiment, the present invention provides a method for blending a plasticizer with a thermoplastic polymer to form a plasticized polymer composition, comprised of about 3 to about 80 weight percent of plasticizer, preferably about 7 to 60 weight percent plasticizer, and most preferably about 10 to about 40 weight percent plasticizer, which comprises (a) blending at least one plasticizer at or above the melt or softening point temperature of said plasticizer with at least one organically-modified clay to form a plasticizer composition; followed by (b) melt blending said composition with a thermoplastic polymer.

In the practice of this invention, solid plasticizers are combined with organically modified, layered smectite clays to form plasticizer/clay composites that may be combined with a thermoplastic resin in a film/sheet extruder or injection-molding machine. The modification with the organically modified clay allows the plasticizer to be combined with the thermoplastic resin without having to go through a separate compounding step. There is considerable cost savings from eliminating the capital equipment to perform the compounding step and avoiding the energy requirement for melting the thermoplastic resin in order to combine it with the plasticizer, only to resolidify the plasticized thermoplastic resin and then melt it a second time to extrude the film or mold the product. There is also an increase in product quality because the degradation caused by going through a compounding process at high temperatures is avoided. Thus, in large measure, the molecular weight of the polymer will be preserved and the color formation due to polymer degradation will be avoided. Furthermore, any difficulty in drying a plasticized resin, such as blocking or loss of plasticizer, is avoided when the formulation is converted to the finished product without an intermediate compounding step.

Preferred swellable layered clay materials include natural, synthetic, and modified phyllosilicates. Illustrative of such clays are smectite clays, such as montmorillonite, bentonite, saponite, and hectorite, synthetic clays, such as synthetic hectorite, and modified clays, such as fluoronated montmorillonite. Preferred swellable layered clay materials are phyllosilicates of the 2:1 type having a cation exchange capacity of 50 to 200 milliequivalents per 100 grams of mineral. The most preferred swellable layered clay materials are smectite clay minerals, especially montmorillonite. The organoclay materials of this invention may be prepared by dispersing the clay in hot water, most preferably from 50 to 80° C., adding the onium ion with agitation, then blending for a period of time sufficient for the onium compound to exchange most of the cations, usually sodium ions, associated with the layers of the clay. It is desirable to use a sufficient amount of the onium ions to exchange most of the cations present in the galleries. The organoclay material is isolated by methods known in the art, such as filtration, centrifugation, gas-fluidized flake drying bed, freeze drying, or spray drying.

In the context of the present invention, a plasticizer is a substance generally added to a thermoplastic polymer to improve processability, flexibility and stretchability. Plasticizers in general may decrease melt viscosity, glass transition temperature and the modulus of elasticity of the neat polymer without altering its fundamental chemical character.

Preferred plasticizers include aromatic carboxylic acid esters that are solid at ambient temperature, i.e., about 24° C. The formula for such esters is as follows:

ArCOOR where Ar is an organic aromatic group. The aromatic group may be derivatized further with halogens, hydroxyl, carboxyl, alkyl or aryl groups. These include esters of benzoic acid, naphthanoic acid, phthalic acid, isophthalic acid, terephthalic acid, and naphthalene dicarboxylic acid. The R group may be aryl, alkyl, derivatized aryl or derivatized alkyl groups. The preferred plasticizers are based on esters of benzoic acid. An additional requirement for these plasticizers is that they be compatible with the thermoplastic resin with which they are to be combined at the level they are to be included.

Other examples of suitable plasticizers include the following:

dimethyl isophthalate
diphenyl isophthalate
t-butyl phenyl diphenyl phosphate
triphenyl phosphate
n-butyl acetyl picrinoleate
butyl ricinoleate
glyceryl tri-(acetyl ricinoleate)
methyl acetyl ricinoleate
propylene glycol ricinoleate
n-ethyl p-toluenesulfonamide
p-toluenesulfonamide
dicyclohexyl phthalate
diethylene glycol dibenzoate
dipropylene glycol dibenzoate
polyethylene glycol 200 dibenzoate
neopentyl glycol dibenzoate
cyclohexanedimethanol dibenzoate
glycerol tribenzoate Preferred onium ions for the process of this invention can be represented as follows:

$$[R_4\text{---}M\text{---}R_2] + X^-$$
$$\begin{array}{c} R_1 \\ | \\ R_3 \end{array}$$

wherein $R_1$, $R_2$, $R_3$, and $R_4$ are independently selected from the group consisting of (a) hydrogen; (b) linear or branched alkyl groups having 1 to 22 carbon atoms; (c) aralkyl groups which are benzyl and substituted benzyl moieties including fused ring moieties having linear chains or branches of 1 to 22 carbon atoms in the alkyl portion of the structure; (d) aryl groups such as phenyl and substituted phenyl including fused ring aromatic substituents; and (e) beta, gamma unsaturated groups having six or less carbon atoms or hydroxyalkyl groups having 2 to 6 carbon atoms; and $X^-$ represents an anion selected from the group consisting of halogen, hydroxide, or acetate anions, preferably chloride and bromide.

Examples of preferred onium ions includes alkyl ammonium ions, such as dodecylammonium, octadecylammonium, dimethyldioctadecylammonium, octadecyltrimethylammonium, benzyldimethyloctadecylammonium, and bis(2- hydroxyethyl)octadecyl methyl ammonium, and the like, and alkyl phosphonium ions, such as octadecyltriphenyl phosphonium. The most preferred ammonium ion for this invention is trimethyloctadecylammonium ion.

The thermoplastic resins referred to herein may be any thermoplastic resins that is conventionally plasticized by a compounding step. The broad classes of such thermoplastic resins include polyesters, polyamides, polycarbonates, cellulose esters and vinyl polymers. Polyesters are the preferred thermoplastic resins. These polyesters cover the range of polyesters made from combinations of the common dicarboxylic acids and diols used in polyesters. Examples of these dicarboxylic acids are terephthalic acid, isophthalic acid, naphthalene dicarboxylic acid, succinic acid, glutaric acid and adipic acid. Examples of common diols are ethylene glycol, 1,3-propanediol, 1,4-butanediol and 1,4-cyclohexane dimethanol. This list is not meant to exclude any particular diacid or diol. The most preferred polyesters are those with at least 50 mole percent of the diacid being terephthalic acid and 50 mole percent of the diol being ethylene glycol.

The organically modified clay may be combined with the plasticizer in a variety of ways. One method, although not preferred, involves the dissolution of the plasticizer in a solvent that will also expand the clay gallery by at least two angstroms allowing the plasticizer to enter the gallery and remain. Further expansion of the gallery by the plasticizer is not necessary although preferred. The solvent is then removed by methods readily practiced in the art such as filtration, centrifugation, gas-fluidized flake drying bed, freeze drying, or spray drying. A more preferred method is melt blending of the plasticizer with the clay. One requirement is that the process of combining the two components be performed above the melting point or softening point of the plasticizer. Many types of heated mixers would be satisfactory for this process, including heated planetary mixers, heated bowl mixers, as well as twin screw extruders. In the case of the twin screw extruder, the extruder produces the plasticizer/clay composite in the form of a strand that may then be easily cut into pellets. These solid pellets may then be blended with pellets of the thermoplastic resin before being fed into the throat of the film/sheet extruder in the practice of the method of the present invention. Alternatively the pellets may be fed simultaneously into the throat of the film/sheet extruder with the pellets of the thermoplastic resin.

EXAMPLES

Samples were made to show the effect of smectite clays as processing aids on the ability of solid, aromatic ester plasticizers to plasticize polyester in a single screw, film extruder. The amorphous polyester used was EASTAR™ PETG Copolyester 6763 from Eastman Chemical Company.

Effectiveness of transport along the extrusion screw was determined by observation of melt film flow uniformity to the chill roll of the film extrusion line. A lack of film flow uniformity was the result of lack of melt supply to the die and occurred when the extruder could no longer transport material to the die. The following scale rated the degree of difficulty in extruding the films:

Rating criteria of the ease of extruding a film
  0=Could not be run
  1=Would run only with continual operator intervention.
  2=Would run, but required intermittent operator intervention
  3=Would run without any operator intervention.

Example One

Trimethyloctadecyl ammonium montmorillonite, abbreviated TMOA montmorillonite, was made by the cation exchange of sodium montmorillonite with trimethyloctadecyl ammonium chloride using well-known methods. The ash content of the TMOA montmorillonite was 73.9%. The TMOA montmorillonite was dried at 100° C. in a vacuum oven with nitrogen as a carrier gas for the removal of water vapor. The vacuum was maintained at 20 inches of mercury. The plasticizer, 1,3-propanediol, 2,2-dimethyl-,dibenzoate, (CAS Registry 4196-89-8) is also known as neopentylglycol dibenzoate herein abbreviated as NPGDB, was dried in a vacuum oven in a manner similar to the clay with the exception of 22° C. as the temperature setting. A physical mixture of 527.7 grams of TMOA montmorillonite and 2610 grams of NPGDB was fed to a Leistritz twin screw extruder at 2 kg/hr. The extruder barrel had an eighteen-millimeter bore and a length to diameter ratio of 40 to 1. The screw design is shown in FIG. 1 . The screw speed was 400 rpm. The extruder had eight zones that were used to describe the effect of flight elements on the melt. The zones were heated as listed below for this example.

| Zone 1 | Zone 2 | Zone 3 | Zone 4 | Zone 5 | Zone 6 | Zone 7 | Zone 8 |
| --- | --- | --- | --- | --- | --- | --- | --- |
| 40° C. | 50° C. | 50° C. | 45° C. | 40° C. | 45° C. | 45° C. | 40° C. |

Adequate cooling must be applied after the die to quickly crystallize the strand, thus, aiding in maintaining strand integrity. The strand was cooled on an air-cooled casting belt and chopped into pellets.

The residual ash of the plasticizer/clay composite was 13.9% by weight when treated in accordance with ASTM D5630-94. Analysis of the platelet separation, given as basal spacing in angstroms, was conducted by Small Angle X-ray Scattering. The instrument used for all examples and comparatives was a model DMC-008 with a Copper $K_\alpha$ emitter ($\lambda$=1.540562), manufactured by SCINTAG. The TMOA montmorillonite had a characteristic basal spacing of 18 Å. Upon melt compounding with NPGDB the basal spacing exhibited an expansion to 39 Å.

Example Two

The TMOA montmorillonite clay was dried as described in example one. The plasticizer, 1,4-Cyclohexanedimethanol, dibenzoate (CAS Registry 35541-

81-2) herein abbreviated CHDMDB was dried in a manner similar to the NPGDB in example one. A physical blend of 175.9 grams of the clay with 870 grams of CHDMDB was fed into the co-rotating twin screw extruder as described in example one, with the exception of temperature changes as listed below for this example.

| Zone 1 | Zone 2 | Zone 3 | Zone 4 | Zone 5 | Zone 6 | Zone 7 | Zone 8 |
|--------|--------|--------|--------|--------|--------|--------|--------|
| 90° C. | 110° C. | 120° C. | 120° C. | 115° C. | 110° C. | 110° C. | 110° C. |

The residual ash of the plasticizer/clay composite was 11.7% by weight. Upon melt compounding with CHDMDB the basal spacing of the composite expanded to approximately 40 Å.

Example Three

This example provides a different procedure for combining the organoammonium montmorillonite clays with solid, aromatic ester plasticizers. Ninety grams of plasticizer were melted in a glass, one-liter, round bottom reaction kettle at 120° C. A twin blade stirrer was turned at approximately 30 rpm to prevent scorching. When the plasticizer was completely liquefied, the speed of the stirrer was increased to 60 rpm and 10 grams organoammonium montmorillonite clay was slowly added over five minutes. After the clay had been added, agitation was continued for ten minutes. The material was poured into a DuPont Teflon™ coated aluminum pan and allowed to cool and crystallize without agitation. The plasticizer and cation exchanged organo-tether used, along with the respective original organo-tether montmorillonite and new nanocomposite basal spacing are listed in the chart below.

| Plasticizer | Organo-tethered Montmorillonite | Original Basal Spacing (Å) | Basal Spacing after addition of Plasticizer (Å) |
|-------------|--------------------------------|----------------------------|-------------------------------------------------|
| NPGDB | Octadecyl trimethyl ammonium | 18 | 39 |
| NPGDB | Benzyl dimethyl H-tallow ammonium | 19 | 39 |
| NPGDB | Dimethyl di(H-tallow) ammonium | 34 | 40 |
| NPGDB | Diethoxylated(2) methyl tallow ammonium | 19 | 37 |
| NPGDB | Diethoxylated(15) methyl octadecyl | 35 | 42 |
| NPGDB | Benzyl di(h-tallow) methyl ammonium | 37 | 40 |
| CHDMDB | Octadecyl trimethyl ammonium | 18 | 40 |
| CHDMDB | Dimethyl, di(h-tallow) ammonium | 34 | 39 |
| CHDMDB | Diethoxylated(15) methyl octadecyl | 35 | 38 |
| GTB | Octadecyl trimethyl ammonium | 18 | 38 |
| GTB | Dimethyl, di(h-tallow) ammonium | 34 | 39 |
| GTB | Diethoxylated(2) methyl tallow ammonium | 19 | 37 |
| GTB | Diethoxylated(15) methyl octadecyl | 35 | 40 |
| GTB | Benzyl di(h-tallow) methyl ammonium | 37 | 39 |

GTB in example three is the abbreviation for glycerol tribenzoate.

Example Four

Eastman EASTAR Copolyester 6763 pellets were dried in a forced air drier at 65° C. for 16 hours. The NPGDB/TMOA montmorillonite composite pellets (from example one) were dried at room temperature for 16 hours in a vacuum oven with nitrogen as a carrier gas to remove water vapor. The vacuum was maintained at 20 inches of mercury. A physical blend of 769 grams of PETG pellets with 231 grams of the NPGDB/TMOA montmorillonite composite pellets was feed to a Killion KTS series single screw extruder. The final film was about 25 wt % plasticizer based on the weight of the polyester. The screw used was a general purpose, one-inch diameter screw with a mattock mixing section and a length to diameter ratio of 24 to one. The extruder has three zones of heating along the screw and two die temperature zones. The zones were heated as listed below for this example.

| Zone 1 | Zone 2 | Zone 3 | Die 1 | Die 2 |
|--------|--------|--------|-------|-------|
| 170° C. | 240° C. | 240° C. | 240° C. | 240° C. |

A six-inch die was used to extrude film. A slight draw was applied by the take up roll. For this example, the ease of film extrusion was rated as three.

Example Five

PETG pellets and plasticizer/clay composite pellets (from example one) were dried as in example four. A physical blend of 535 grams of PETG with 465 grams of plasticizer/clay composite (from example one) was extruded into film that was 75 wt % plasticizer based on the weight of the polyester. The extrusion was performed in the same manner as example four with the exception of process temperature changes listed below to allow for a lower viscosity product.

| Zone 1 | Zone 2 | Zone 3 | Die 1 | Die 2 |
|---|---|---|---|---|
| 200° C. | 220° C. | 235° C. | 200° C. | 200° C. |

For this example, the ease of film extrusion rating was two.

Example Six

PETG pellets and plasticizer/clay composite pellets (from example one) were dried as in example four. A physical blend of 753 grams of PETG with 247 grams of plasticizer/clay composite was extruded into a film that was about 28 wt % plasticizer based on the weight of the polyester in the same manner as example four. For this example, the ease of film extrusion rating was three.

Example Seven

PETG pellets were dried as in example four and CHDMDB/TMOA montmorillonite composite pellets (from example two) were dried at room temperature for 16 hours in a vacuum oven with nitrogen as a carrier gas for the removal of water vapor. The vacuum was maintained at 20 inches of mercury. A physical blend of 773.6 grams of PETG with 226.4 grams of CHDMDB/TMOA montmorillonite composite was processed through the single screw extruder into film as in example four with the exception of the process temperature changes listed below.

| Zone 1 | Zone 2 | Zone 3 | Die 1 | Die 2 |
|---|---|---|---|---|
| 200° C. | 220° C. | 230° C. | 200° C. | 200° C. |

For this example, the ease of film extrusion rating was three.

Example Eight

PCTA pellets were dried in the same manner as PETG pellets in example four and CHDMDB/TMOA montmorillonite composite pellets (from example two) were dried as in example seven. A physical blend of 773.6 grams of PCTA with 226.4 grams of CHDMDB/TMOA montmorillonite composite was extruded into a film as example four with the exception of process temperature changes as listed below.

| Zone 1 | Zone 2 | Zone 3 | Die 1 | Die 2 |
|---|---|---|---|---|
| 210° C. | 230° C. | 240° C. | 210° C. | 210° C. |

The ease of film extrusion rating was three for this example.

Example Nine

Eastman EASTAPAK 9921 pellets were dried in a forced air drier for 16 hours at 150° C. CHDMDB/TMOA montmorillonite composite pellets (from example two) were dried as in example seven. A physical blend of 773.6 grams of PET with 226.4 grams of CHDMDB/TMOA montmorillonite composite was extruded into a film as example four with the exception of the processing temperature changes as listed below.

| Zone 1 | Zone 2 | Zone 3 | Die 1 | Die 2 |
|---|---|---|---|---|
| 235° C. | 260° C. | 260° C. | 260° C. | 260° C. |

For this example, the ease of film extrusion rating was three.

Example Ten

A heated Sigma Blade mixing bowl was use to melt 3800 grams of NPGDB at 80° C. The folding agitation was discontinued upon fully melting the plasticizer and 267 grams of trimethyloctadecyl ammonium montmorillonite clay were added gradually with high shear mixing. The high shear mixing was input using a T-50 Turrax rotor-stator disperser manufactured by IKA Works Company, with a course head, at 10,000 rpm. The high shear was maintained for 20 minutes, at which time, the temperature was reduced and the melt mixture was fold mixed by the sigma blades until cooling of the mixture induced crystallization. The mixer was able to break up the batch into a granular powder. The ash content of organoammonium montmorillonite clay composite was 4.9 wt %.

Example Eleven

PETG was ground using a Wiley Mill to pass a 2 mm screen. The PETG powder was dried at 65° C. for 16 hours in a vacuum oven with nitrogen as a carrier gas for the removal of water vapor. The vacuum was maintained at 20 inches of mercury. NPGDB/TMOA montmorillonite composite from example ten was dried at room temperature in a vacuum oven with nitrogen as a carrier gas for the removal of water vapor. The vacuum was maintained at 20 inches of mercury. A physical blend of 894.7 grams of PETG with 105.3 grams of NPGDB composite powder was processed into film that was 11 wt % plasticizer based on the weight of the polyester in the same manner as example four with the exception of process temperature changes listed below.

| Zone 1 | Zone 2 | Zone 3 | Die 1 | Die 2 |
|---|---|---|---|---|
| 175° C. | 175° C. | 175° C. | 175° C. | 175° C. |

The ease of film extrusion rating was two for this example.

Comparative Example One

PETG pellets were dried as in example four and NPGDB powder that contained no organoammonium montmorillonite was dried as described in example one. A physical blend of 800 grams of the dried PETG pellets with 200 grams of NPGDB powder was processed into film as described in example four. For this example, the ease of film extrusion rating was zero.

Comparative Example Two

PETG pellets were dried as in example four and CHDMDB flakes that contained no organoammonium montmorillonite were dried as described in example two. A physical blend of 800 grams of the dried PETG pellets with 200 grams of CHDMDB flakes was processed into film as described in example seven. For this example, the ease of film extrusion rating was zero.

Comparative Example Three

PCTA pellets were dried as in example eight and CHDMDB flakes that contained no organoammonium montmorillonite were dried as described in example two. A physical blend of 800 grams of PCTA pellets with 200 grams of CHDMDB flakes was processed for film as described in example eight. For this example, the ease of film extrusion rating was one.

Comparative Example Four

PET pellets were dried as in example nine and CHDMDB flakes that contained no organoammonium montmorillonite were dried as described in example two. A physical blend of 800 grams of PET pellets with 200 grams of CHDMDB flakes was processed for film as described in example nine. For this example, the ease of film extrusion rating was one.

Comparative Example Five

PETG powder was ground and dried as in example five and NPGDB nanocomposite powder (from example five) was prepared for extrusion as described in example five. A physical blend of 419 grams of PETG powder with 581 grams of NPGDB nanocomposite powder was processed for film that was 129 wt % plasticizer based on the weight of the polyester in the same manner as example four. For this example, the ease of film extrusion rating was zero.

We claim:

1. A pelletized plasticizer composition suitable for use in thermoplastics with either extrusion or injection molding applications, comprising a plasticizer and an organically-modified clay, wherein said composition contains less than 4% total water by weight.

2. The composition of claim 1, wherein said composition contains less than 1% bound water by weight.

3. The composition of claim 1, wherein the plasticizer is an aromatic carboxylic ester.

4. The composition of claim 1, wherein the plasticizer is a compound of the formula ArCOOR wherein Ar is a phenyl or napthyl group, optionally substituted by $C_1$–$C_8$ alkyl, $C_1$–$C_8$ alkoxy, $C_1$–$C_8$ alkoxycarbonyl, or halo; and wherein R is phenyl or napthyl, optionally substituted by $C_1$–$C_8$ alkyl, $C_1$–$C_8$ alkoxy, $C_1$–$C_8$ alkoxycarbonyl, or halo.

5. The composition of claim 1, wherein the plasticizer is selected from the group consisting of dimethyl isopthalate;
diphenyl isopthalate;
t-butyl phenyl diphenyl phosphate;
isodecyl diphenyl phosphate;
triphenyl phosphate;
n-butyl acetyl picrinoleate;
butyl ricinoleate;
glyceryl tri-(acetyl ricinoleate)
methyl acetyl ricinoleate;
propolene glycol ricinoleate
n-ethyl o-toluenesulfonamide;
o-toluenesulfonamide;
dicyclohexyl pthalate;
diethylene glycol dibenzoate;
dipropylene glycol dibenzoate;
polyethylene glycol 200 dibenzoate;
neopentyl glycol dibenzoate;
cyclohexanedimethanol dibenzoate; and
glycerol tribenzoate.

6. The composition of claim 1, wherein the clay is selected from the group consisting of natural, synthetic, and modified phyllosilicates.

7. The composition of claim 6, wherein the clay is selected from the group consisting of montmorillonite, bentonite, saponite, and hectorite.

8. The composition of claim 1, wherein said clay is a modified clay which is a swellable, layered clay material wherein an inorganic cation has been exchanged for an organic onium ion of the formula

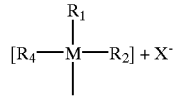

wherein $R_1$, $R_2$, $R_3$, and $R_4$ are independently selected from the group consisting of (a) hydrogen; (b) linear or branched alkyl groups having 1 to 22 carbon atoms; (c) aralkyl groups which are benzyl and substituted benzyl moieties including fused ring moieties having linear chains or branches of 1 to 22 carbon atoms in the alkyl portion of the structure; (d) aryl groups; and (e) beta, gamma unsaturated groups having six or less carbon atoms or hydroxyalkyl groups having 2 to 6 carbon atoms; and $X^-$ represents and anion selected from the group consisting of halogen, hydroxide, and acetate anions.

9. The composition of claim 8, wherein the onium ion is selected from the group consisting of dodecylammonium, octadecylammonium, dimethyldioctadecylammonium, octadecyltrimethylammonium, benzyldimethylocatedcylammonium, bis(2-hydroxyethyl) octadecyl methyl ammonium, and octadecyltriphenyl phosphonium.

10. A method for blending a plasticizer with a thermoplastic polymer to form a plasticized polymer composition, comprised of about 3 to about 80 weight percent plasticizer, which comprises (a) blending at least one plasticizer at or above the melt or softening point temperature of said plasticizer with at least one organically modified clay to form a pelletized plasticizer composition; followed by (b) melt blending said composition with a thermoplastic polymer.

11. The method of claim 10, wherein said blending is conducted in an extruder.

12. The method of claim 10, wherein said melt blending is conducted in a single screw extruder.

13. The method of claim 11, wherein said melt blending is conducted at a temperature of about 50 to about 350° C. with a residence time in said extruder of about 5 seconds to about 5 minutes.

14. The method of claim 10, wherein the thermoplastic polymer is selected from the group consisting of polyolefins, polyesters, polyurethanes, cellulose esters, polyamides, polyacrylates, polystyrenes, and polyvinyl chlorides.

15. The method of claim 10, wherein the relative proportion of said plasticizer composition to said thermoplastic composition is from about 7 to about 60 percent by weight.

16. The method of claim 10, wherein the relative proportion of said plasticzer composition to said thermoplastic composition is from about 10 to about 40 percent by weight.

* * * * *

UNITED STATES PATENT AND TRADEMARK OFFICE
CERTIFICATE OF CORRECTION

PATENT NO. : 6,596,802 B1  Page 1 of 1
DATED : July 22, 2003
INVENTOR(S) : Sand et al.

It is certified that error appears in the above-identified patent and that said Letters Patent is hereby corrected as shown below:

Column 12,
Lines 27-33, reads as follows:

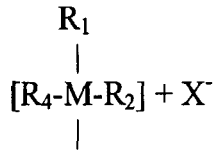

but should read:

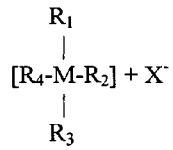

Signed and Sealed this

Sixteenth Day of December, 2003

JAMES E. ROGAN
*Director of the United States Patent and Trademark Office*